United States Patent
Kruschwitz et al.

(12) 
(10) Patent No.: US 6,594,090 B2
(45) Date of Patent: Jul. 15, 2003

(54) LASER PROJECTION DISPLAY SYSTEM

(75) Inventors: Brian E. Kruschwitz, Rochester, NY (US); Andrew F. Kurtz, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 30 days.

(21) Appl. No.: 09/940,196

(22) Filed: Aug. 27, 2001

(65) Prior Publication Data

US 2003/0039036 A1 Feb. 27, 2003

(51) Int. Cl.[7] .................. G02B 13/20; G02B 27/14; G03B 21/00; G09G 3/36; H01S 3/08
(52) U.S. Cl. ............... 359/707; 359/634; 353/31; 345/88; 372/108
(58) Field of Search ................ 359/622, 634, 359/707; 353/31; 372/108; 345/88

(56) References Cited

U.S. PATENT DOCUMENTS

| | | | |
|---|---|---|---|
| 2,403,731 A | 7/1946 | MacNeille | 359/488 |
| 3,490,827 A | 1/1970 | VanLigten et al. | 359/32 |
| 3,588,217 A | 6/1971 | Mathisen | 359/32 |
| 4,035,068 A | 7/1977 | Rawson | 353/122 |
| 5,224,200 A | 6/1993 | Rasmussen et al. | 385/146 |
| 5,255,082 A * | 10/1993 | Tamada | 348/750 |
| 5,272,473 A | 12/1993 | Thompson et al. | 345/7 |
| 5,313,479 A | 5/1994 | Florence | 372/26 |
| 5,317,348 A * | 5/1994 | Knize | 353/31 |
| 5,517,263 A * | 5/1996 | Minich et al. | 353/31 |
| 5,537,258 A * | 7/1996 | Yamazaki et al. | 359/684 |
| 5,700,076 A * | 12/1997 | Minich et al. | 353/31 |
| 5,729,374 A * | 3/1998 | Tiszauer et al. | 359/212 |
| 6,005,722 A | 12/1999 | Butterworth et al. | 359/712 |
| 6,081,381 A * | 6/2000 | Shalapenok et al. | 359/619 |
| 2001/0046033 A1 * | 11/2001 | Troyer | 353/31 |
| 2002/0126479 A1 * | 9/2002 | Zhai et al. | 362/244 |
| 2003/0030880 A1 * | 2/2003 | Ramanujan et al. | 359/245 |
| 2003/0039036 A1 * | 2/2003 | Kruschwitz et al. | 359/707 |

* cited by examiner

Primary Examiner—Hung Xuan Dang
Assistant Examiner—David N. Spector
(74) Attorney, Agent, or Firm—Thomas H. Close

(57) ABSTRACT

A display apparatus, includes a laser light source for emitting a light beam; a beam expander for expanding the light beam; a spatial light modulator; beam shaping optics for shaping the expanded laser beam to provide uniform illumination of the spatial light modulator, the beam shaping optics including a fly's eye integrator having an array of lenslets; and a moving diffuser located in the laser beam between the laser light source and the spatial light modulator.

35 Claims, 6 Drawing Sheets

LASER PROJECTION DISPLAY SYSTEM

FIELD OF THE INVENTION

The invention relates to projection display apparatus employing a laser as a light source. More particularly, the invention relates to laser projection display apparatus having means for reducing the appearance of coherence-induced artifacts and speckle in the display.

BACKGROUND OF THE INVENTION

Projection display systems for the display of video images are well-known in the prior art. Typically, these systems have taken the basic form of a white light source, most notably a xenon arc lamp, illuminating one or more light valves or spatial light modulators with appropriate color filtering to form the desired image, the image being projected onto a viewing screen.

Lasers have been known to be attractive alternative light sources to arc lamps for projection displays. One potential advantage is a wider color gamut featuring very saturated colors. Laser illumination offers the potential for simple, low-cost efficient optical systems, providing improved efficiency and higher contrast when paired with some spatial light modulators. One disadvantage of lasers for projection display has been the lack of a cost-effective laser source with sufficient power at visible wavelengths.

Spatial light modulators provide another component that enables laser display systems. Examples of two-dimensional spatial light modulators are reflective liquid crystal modulators such as the liquid-crystal-on-silicon (LCOS) modulators available from JVC, Three-Five, Aurora, and Philips, and micromirror arrays such as the Digital Light Processing (DLP) chips available from Texas Instruments. Advantages of two-dimensional modulators over one-dimensional array modulators and raster-scanned systems are the absence of scanning required, absence of streak artifacts due to non-uniformities in the modulator array, and immunity to laser noise at frequencies much greater than the frame refresh rate ($\geq$120 Hz). A further advantage of two-dimensional spatial light modulators is the wide tolerance for reduction of the spatial coherence of the illuminating beam. Examples of one-dimensional or linear spatial light modulators are the Grating Light Valve (GLV) produced by Silicon Light Machines and conformal grating modulators; see U.S. Ser. No. 09/491,354, filed Jan. 26, 2000, by Kowarz, and U.S. Ser. No. 09/867,927 filed May 30, 2001, by Kowarz et al.

Although high power visible lasers offer new opportunities for the design of projection systems, including the possibilities of expanded color gamut and simplified optical designs, laser light is in other ways not optimum for use in image projection systems with spatial light modulators. In particular, lasers are very bright sources, which emit generally coherent light within a very small optical volume (etendue or lagrange). Etendue is the product of the focal spot area and the solid angle of the beam at the focus. Lagrange is the product of the focal spot radius and the numerical aperture. For example, a single mode green wavelength laser with a diffraction-limited beam has a lagrange of about 0.3 $\mu$m, which is about 15,000 times smaller than the lagrange for a conventional white light lamp source, such as an arc lamp. With such a small lagrange, lasers can be used very effectively in raster scanning systems, including those for flying spot printers and laser light shows, where a tightly controlled beam is desirable.

On the other hand, in an image projection system, in which an image-bearing medium such as a film or a spatial light modulator is imaged to a screen or a target plane, the high coherence and small lagrange of the laser is ultimately undesirable. In such an imaging system, the lagrange is determined by the linear size of the projected area (size of the spatial light modulator) multiplied by the numerical aperture of the collection lens. The related quantity, etendue, is calculated similarly. In many white light projection systems, the projection lens is quite fast (f/3 for example) to collect as much light as possible. Even so, the typical white light lamp source overfills both the light valve and the projection lens, and significant light is lost. For example, in a representative system using a common 0.9" diagonal light valve and an f/3 projection lens, the optimum light source would have approximately a 2.0-mm lagrange to provide proper filling without overfill. However, a standard white light lamp, with a typical lagrange of 2–10 mm, is not sufficiently bright and will generally overfill this representative system.

In the case of a laser display system using image area projection, the opposite problem arises, the lasers being too bright. Furthermore, it is not desirable to illuminate the spatial light modulator with a coherent source, because of the potential for interference effects, such as fringes, which may overlay the displayed image. This is especially true of liquid crystal modulators, wherein the thin-film structure can result in fringes in the image due to nonuniformities in the film layers. Likewise, coherent illumination of the entire light valve may create an artificial beam apodization, which is dependent on the image content, arising from diffraction from pixels and groups of pixels. Diffraction artifacts can also arise from illuminating the grid electrode pattern of a liquid crystal panel, an X-cube with a center discontinuity, or any dust or imperfections on the optical elements with a highly coherent beam of light. Therefore, a reduction of the source brightness (or an increase in the source lagrange) is a necessity for such laser projection systems.

A defined reduction of the source brightness can also provide an important opportunity. The projection display optical system can be designed to optimize and balance the system requirements for resolution, system light efficiency, and system simplicity. By defining the system f-number on the basis of a criterion other than system light efficiency, the specifications on other system components such as the projection lens, color filters, and polarization optics can be eased, dramatically reducing system costs compared to lamp-based projection systems.

While laser sources can be optimized for use in projection display illumination and imaging systems, there is the consequent major disadvantage of speckle to be dealt with. Speckle arises due to the high degree of coherence (both spatial and temporal) inherent in most laser sources. Speckle produces a noise component in the image that appears as a granular structure, which both degrades the actual sharpness of the image and annoys the viewer. As such, the speckle problem, as well as the historical lack of appropriate laser sources, has inhibited the development of marketable laser-based display systems.

The prior art is rich in ways of attempting to reduce speckle. One common approach is to reduce the temporal coherence by broadening the linewidth of the laser light. Other approaches to reducing the temporal coherence are to split the illuminating wavefront into beamlets and delay them relative to each other by longer than the coherence time of the laser, see for example U.S. Pat. No. 5,224,200, issued Jun. 29, 1993 to Rasmussen et al. Dynamically varying the speckle pattern by vibrating or dynamically altering the screen is another way of reducing the visibility of the speckle pattern. See, for example, U.S. Pat. No. 5,272,473 issued Dec. 21, 1993 to Thompson et al. Another speckle reduction approach involves coupling the laser light into a multimode optical fiber and vibrating the fiber to cause mode-scrambling as described in U.S. Pat. No. 3,588,217, issued Jun. 28, 1971 to Mathisen.

Another family of despeckling solutions uses a diffusing element that is moved or vibrated within the projector system. Typically, this is done at an intermediate image plane, as disclosed in U.S. Pat. No. 4,035,068, issued Jul. 12, 1977 to Rawson. One disadvantage of this approach is that the diffusion must occur precisely at the image plane or a softening of the image will occur. Also, the projection lens is complicated by the requirement to provide an intermediate image plane. A means of dynamically varying the speckle pattern by dynamically diffusing the laser beam in the illumination path of the device would be preferable. A hologram illumination system utilizing this approach has been disclosed by van Ligten in U.S. Pat. No. 3,490,827, issued Jan. 20, 1970, in which a diffuser is rotated in the focus of a beam expander. Florence discloses in U.S. Pat. No. 5,313,479, issued May 17, 1994, illuminating a light valve through a rotating diffuser. These approaches have the disadvantage of not being adaptable to uniform efficient illumination of a rectangular spatial light modulator. Butterworth et al. in U.S. Pat. No. 6,005,722, issued Dec. 21, 1999, disclose a system in which a variable-thickness plate is rotated in the illumination of a lightpipe homogenizer. When used with lasers, though, light pipe homogenizers require either a large numerical aperture or a substantial length to achieve sufficient uniformity, and offer less control with fewer degrees of design freedom than systems designed with fly's eye optics. Therefore, it is harder to control the illumination brightness while producing a uniform illumination in a compact system. Furthermore, modeling performed by the present inventors suggests that in a long-throw projection system, the diffuser should be placed near a position conjugate to the screen in order to reduce speckle. This condition is not achieved in the system disclosed by Butterworth et al, wherein the diffuser is at the input of a light pipe.

There is a need therefore for a laser-based display system that uses a spatial light modulator, allows control of the illumination brightness to optimize system design, and exhibits reduced speckle and eliminates coherence artifacts at the spatial light modulator while exhibiting high throughput efficiency.

SUMMARY OF THE INVENTION

The need is met by providing a display apparatus that includes a laser light source for emitting a light beam; a beam expander for expanding the light beam; a spatial light modulator; beam shaping optics for shaping the expanded laser beam to provide uniform illumination of the spatial light modulator, the beam shaping optics including a fly's eye integrator having an array of lenslets; and a moving diffuser located in the laser beam between the laser light source and the spatial light modulator.

Advantages

The display device of the present invention has all of the advantages of a laser display system, including high brightness, and saturated colors, with substantially reduced speckle. It also removes the speckle in such a way that neither image quality nor illumination efficiency is compromised, in contrast with other despeckling techniques using diffusers. Further, the invention allows for the control of the illumination lagrange (or etendue) in order to optimize the design of the optical system.

DETAILED DESCRIPTION OF THE INVENTION

Figure 1:
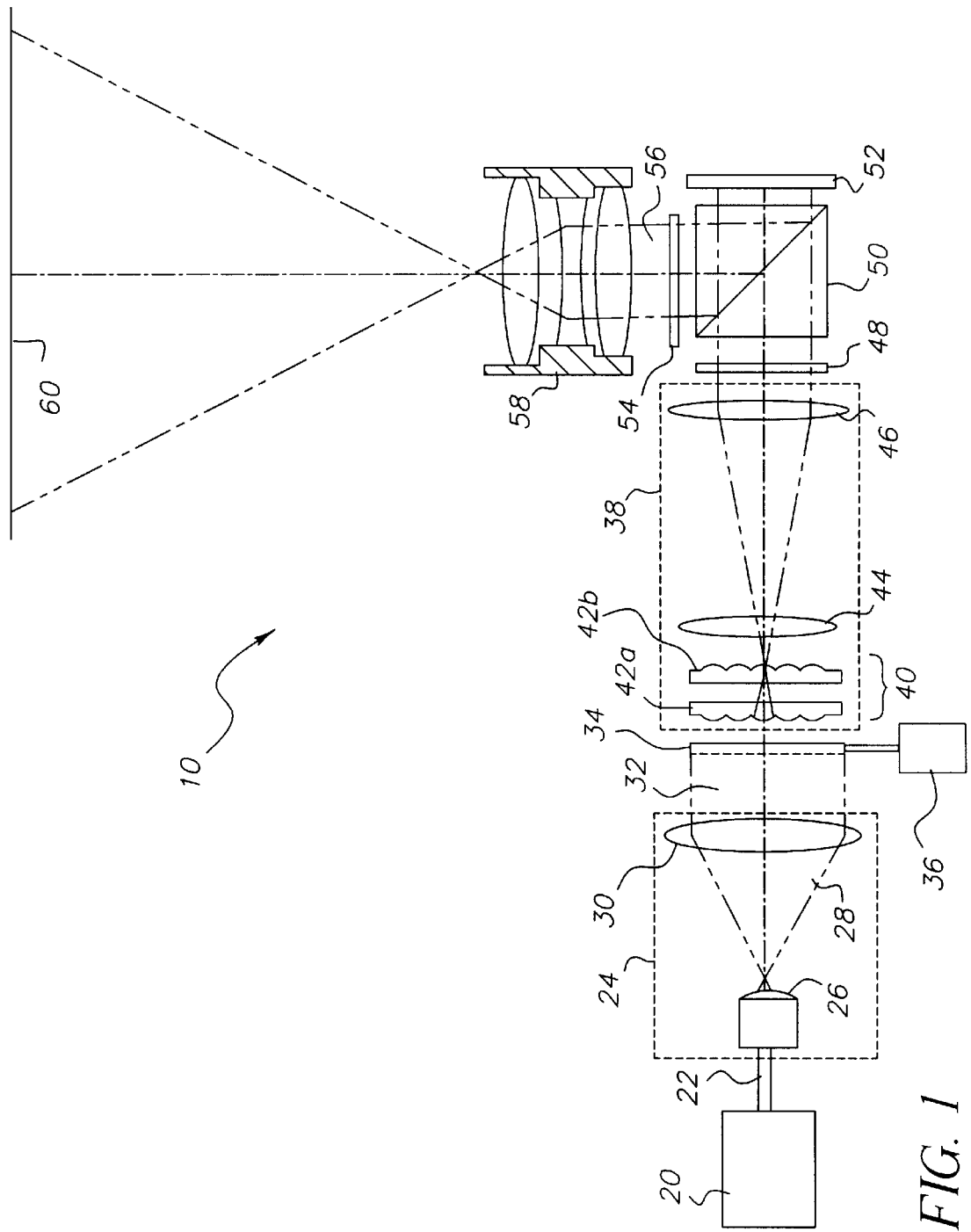
FIG. 1 is a cross-sectional view of the laser display system according to the present invention using a liquid crystal light valve.

Referring to FIG. 1 a laser display system 10 according to one embodiment of the present invention includes a laser 20 that emits a laser beam 22 of a desired wavelength in either a continuous or pulsed fashion. The laser 20 can be, for example, a solid state laser, a fiber laser, a gas laser, or a semiconductor laser. Laser 20 is preferably a diode-laser-pumped solid state laser including a laser crystal (e.g. Nd:YAG, Nd:YLF, Nd:YVO$_4$, or Yb:YAG) that emits infrared pulses of light and includes nonlinear optics (typically optical parametric oscillators (OPOs)) that convert the infrared pulses of light from the laser crystal into red, green, and blue pulses of light. Mode-locked RGB lasers suitable for laser 20 are manufactured by Lumera Laser GmbH and JenOptik. Another suitable laser is the Q-switched RGB laser developed by Q-Peak. For simplicity, the laser display system 10 is depicted for one wavelength only.

Beam expansion optics 24 expand the laser beam to produce a collimated beam 32 with the necessary diameter to nominally fill the aperture of beam-shaping optics 38. The beam expansion optics 24 can be, for example, an afocal pair of lenses, as is well-known to one skilled in the art of optics. Alternately, for example, a three element zooming Galilean or Keplerian beam expander could be used. The afocal pair beam expansion optics 24 comprise a diverging lens 26 and a collimating lens 30. The diverging lens 26 can be a singlet lens or a compound lens such as a microscope objective, and transforms the light beam 22 into a diverging beam 28. The collimating lens 30 can be a singlet or a compound lens, and transforms the diverging beam 28 into a collimated beam 32.

A diffuser 34, is disposed between the laser 20 and the beam-shaping optics 38, and modifies the brightness or etendue of the laser light to match the imaging requirements of the projection system. The diffuser 34 is designed to have a maximum diffusion angle $\theta_D$, and is preferably a holographic diffuser such as those produced by the Physical Optics Corp. or a randomized microlens array such as those produced by Corning—Rochester Photonics Corp.

The beam-shaping optics 38 includes a fly's eye integrator 40. The fly's eye integrator 40 provides efficient, uniform illumination over the area of a liquid-crystal spatial light modulator 52. The fly's eye integrator 40 includes a first lenslet array 42a and a second lenslet array 42b, which are typically identical. The first and second lenslet arrays 42a and 42b include a plurality of lenslets with spherical surfaces, arrayed in a two-dimensional pattern. The second lenslet array 42b is separated from the first lenslet array 42a by approximately the focal length of the lenslets on the first lenslet array 42a, such that each lenslet in the first lenslet array 42a focuses light into the corresponding lenslet in the second lenslet array 42b. The lenslets have a rectangular shape with an aspect ratio equal to the desired aspect ratio of the illumination, which typically matches the aspect ratio of the liquid-crystal spatial light modulator 52. Other designs are possible in which the first and second lenslet arrays 42a and 42b are different, but are matched to provide the desired illumination.

Alternately, the first and second lenslet arrays 42a and 42b can be integrated in a single block of glass or plastic. Also, the invention can be accomplished without the use of the second lenslet array 42b, especially if a small diffusion angle is used.

The beam-shaping optics 38 also includes a condenser lens 44 and a field lens 46 located behind the fly's eye integrator 40. The second lenslet array 42b, works in combination with the condenser lens 44, to image the lenslets of first lenslet array 42a in overlapping fashion to provide a rectangular area of uniform illumination at the liquid-crystal spatial light modulator 52. Field lens 46 provides telecentric illumination of the liquid-crystal spatial light modulator 52 in order to desensitize the system to defocus errors and to minimize the total numerical aperture of the illumination. Field lens 46 nominally has a focal length equal to the lenslet focal length multiplied by the magnification of the illumination image. The spacing between the field lens 46 and the condenser lens 44 should likewise be nearly equal to the focal length of the field lens 46 in order to make the illumination telecentric. The focal lengths of the lenslet arrays and condenser lens 44 are typically chosen to provide sufficient working distance near the liquid-crystal spatial light modulator 52 that the optomechanics can be designed with relative ease.

The liquid-crystal spatial light modulator 52 includes a plurality of modulator elements, or pixels (not shown), disposed in a two-dimensional array over a rectangular area. In a preferred embodiment, the liquid-crystal spatial light modulator 52 is a liquid-crystal-on-silicon (LCOS) panel, such as the D-ILA device available from JVC or other LCOS panels available from Philips, 3-5, and Aurora.

Projection display systems utilizing liquid-crystal light valves require careful control of the polarization of the illumination to maximize performance. Lasers provide an important advantage in this sense, because the light that they emit is typically highly polarized (100:1, for example). However, some diffusers have been known to depolarize light beams, and therefore an optional pre-polarizer 48 may be required between the diffuser 34 and the liquid-crystal spatial light modulator 52, depending on the polarization retention properties of the diffuser 34. The diffuser polarization retention properties are dependent on the substrate material, with plastic substrates depolarizing light beams significantly more than glass substrates. In laboratory experiments, the birefringence inherent in polycarbonate has been observed to convert linearly polarized incident light into elliptically polarized light with an ellipticity of 21.7° when passed through a 0.76-mm-thick polycarbonate holographic diffuser. In contrast, no measurable change in the polarization was observed from a 2-mm-thick silica holographic diffuser.

A polarizing beam splitter 50 is placed between the field lens 46 and the liquid-crystal spatial light modulator 52. This polarizing beam splitter transmits the polarized incident light to the liquid-crystal spatial light modulator 52. For best contrast, the preferred location for the pre-polarizer 48 is immediately before the polarizing beam splitter 50. Individual pixels on the liquid-crystal spatial light modulator 52 modulate the light by modifying the polarization to produce a component of the light polarized orthogonally to the light beam 22. The proportion of the orthogonally polarized light is controlled by an application of a voltage to each pixel of the liquid-crystal spatial light modulator 52. Thus, a modulated light beam 56 that is orthogonally polarized from the light beam 22 is reflected by the polarizing beam splitter 50. An analyzer 54 can be placed in the imaging path after the polarizing beam splitter 50 to improve the contrast of the display. The polarizing beam splitter 50 is preferably a MacNielle type prism of the type disclosed in U.S. Pat. No. 2,403,731, which is incorporated herein by reference.

The modulated light beam 56 that is transmitted by the analyzer 54 is collected by a projection lens 58. The projection lens 58 forms an image of the liquid-crystal spatial light modulator 52 onto a screen 60. The screen 60 can be either a reflective screen for front-projection applications such as cinema, or a transmissive diffusing screen for rear-projection applications such as computer monitors or home theater.

Although FIG. 1 shows the case in which the incident light is transmitted by the polarizing beam splitter 50, the laser display system 10 can also be configured with the incident light being reflected by the polarizing beam splitter 50. Alternately, plate polarizing beam splitters or wire-grid polarizers can be used in place of the beam splitter cube shown for the polarizing beam splitter 50. Further, retardation plate compensators (not shown) can be included between the polarizing beam splitter 50 and the liquid crystal spatial light modulator 52 in order to maximize contrast for a given laser wavelength.

The diffuser 34 is employed within the illumination optical system of the laser projection display 10 to accomplish the goals of reducing both the source brightness (increasing lagrange) and the source coherence. The diffuser angle $\theta_D$ and the location of the diffuser 34 should be selected with these goals in mind. The lagrange of the system will be dominated by the product of the illumination beam profile half-width on the diffuser 34 and the half-angle of the light scattered by the diffuser 34. Depending on the desired image resolution, which depends on the resolution of the liquid-crystal spatial light modulator 52 and the imaging properties of the projection lens 58, the projection lens may have an f-number in the f/7 to f/15 range instead of the f/3 required by prior art systems. The actual design target for the lens f-number will depend on the imaging criteria specified to determine the quality of the lens (for example, a Rayleigh or Sparrow imaging criteria could be applied).

As an example, the combination of 0.9" diagonal liquid-crystal spatial light modulator 52 and an f/10 projection lens 58, will specify a target lagrange of the projection system of ~0.6 mm. In this example, the diffuser 34 can have a half angle $\theta_D=3°$ and be placed within the illumination system such that it is illuminated by a collimated beam with 22-mm diameter. In this example, the lagrange of the laser light will be reduced from ~0.3 $\mu$m to ~0.57 mm, and a specular f/10 beam would be provided to a 0.9" diagonal liquid-crystal spatial light modulator 52.

Thus, through the selection of the appropriate diffuser 34, the lagrange or brightness of the effective laser light source can be defined to match the needs of the optical system, thereby boosting system light efficiency and simplifying the optical design, as compared to a traditional lamp based system.

While diffuser 34 does reduce the coherence of the laser light to some extent, the laser light will remain sufficiently coherent to impart speckle into the outgoing beam. Unless this speckle is further reduced, it will be present at both the liquid-crystal spatial light modulator 52 and the screen 60 as an undesired random variation in light intensity. However, the fly's eye integrator 40, which primarily provides uniform illumination to the liquid-crystal spatial light modulator 52, also amplifies the effect of the diffuser 34 on despeckling and artifact removal. This comes about by overlapping many contributions from the diffuser 34 on the liquid crystal spatial light modulator 52 and therefore in the image on the screen 60. Although the resulting speckle within the illuminating light at the liquid-crystal spatial light modulator 52 and screen 60 is significantly reduced in size and magnitude compared to a similar system without the fly's eye integrator 40, this remaining speckle can still be objectionable in critical applications.

To further reduce speckle, diffuser 34 is attached to a motion imparting means 36, which imparts a linear, rotary, or random motion to the diffuser 34 such that the diffuser 34 moves by at least the characteristic feature size of the diffusing surface. The frequency of the motion must be faster than the flicker frequency (e.g. about 40 Hz). The motion imparting means 36 may comprise, for example, an electric motor connected to the diffuser 34 to impart a circular or elliptical motion to the diffuser 34. Alternately, the motion imparting means 36 may comprise a vibrator motor containing an imbalanced rotor, the vibrator motor being mounted with the diffuser 34 on springs. Motion imparting means 36 can also be provided as a voltage controlled linear actuator supplied with an AC drive or as a rotating wheel that imparts a rotary motion to the diffuser 34.

The combination of using the fly's eye integrator 40 and the moving diffuser 34 within laser projection display 10 provides a greatly enhanced speckle reduction. The diffuser 34 produces a speckle pattern on the surface of the liquid-crystal spatial light modulator 52 and on the screen 60 that becomes decorrelated after a small motion of the diffuser 34 due to the effect of the fly's eye integrator 40. The result is that a much smaller motion of the diffuser 34 can be used or a much larger number of averaged speckle patterns are obtained for the same motion of the diffuser 34 when compared with prior art systems.

Further, placement of the diffuser 34 in the illumination system ensures that the diffuser 34 does not degrade the image quality. When an object is imaged through a diffuser there is a degree of softening of the image that depends on the relative location of the diffuser in the imaging system. The least amount of softening arises when the diffuser is located at an intermediate image plane, in which case the softening arises from the diffuser surface structure. The image quality degradation grows substantially worse if there is a slight error in the diffuser placement, or longitudinal motion of the diffuser relative to the optical axis. Placing the diffuser 34 in the illumination path obviates the need for careful placement of the diffuser at a plane conjugate to the light valve because imaging does not occur through the diffuser 34.

There are other options for the location of the diffuser 34 within the illumination path than that shown in FIG. 1. The preferred location, shown in FIG. 1, is immediately before the fly's eye integrator 40. This is preferred for a number of reasons. First, the appropriate lagrange can be achieved with a low diffusion angle $\theta_D$, thereby ensuring good throughput through the fly's eye integrator 40. Secondly, no softening of the rectangular illumination of the liquid-crystal spatial light modulator 52 is produced because the diffuser 34 is located before the fly's eye integrator 40. Third, being just before the fly's eye integrator 40, the advantage of the fly's eye integrator 40 overlapping the phase contributions from various diffuser features is maximized. Fourth, being in collimated space, the angular dependence on the diffusion properties does not lead to a variation in diffusion over the spatial extent of the beam.

There are various alternative locations of the moving diffuser 34 that can be achieved according to the present invention. For example, the diffuser 34 can be placed before the collimating lens 30. Due to the NA (numerical aperture) of the laser beam expansion and the smaller beam size, this would require a slightly larger diffusion angle to achieve the same brightness reduction as compared to the preferred location. This can be an advantage when the required diffusion angle in the preferred location becomes too low for commercially available diffusers. Another advantage is that with a given diffuser 34, the source lagrange can be accurately set by selecting the position of the diffuser 34 relative to the collimating lens 30. A disadvantage is that the diffusion properties vary over the beam area due to the dependence of the diffuser 34 on incidence angle, which could affect speckle reduction and uniformity.

Another possible location for the diffuser 34 is at the focus of the diverging lens 26. This can be useful when a very small reduction in the laser brightness is desired, as the lagrange is dominated by an increase in the angular extent (numerical aperture) of the beam as introduced by the diffuser 34 working in combination with the beam expander 24. This can result in relatively small brightness decreases (<20×), as opposed to the orders of magnitude brightness decrease obtained by placing the diffuser 34 in the collimated beam 32. This location has the disadvantages of not being very efficient for large brightness decreases due to vignetting at the collimating lens 30 with large diffusion angles. Furthermore, the lagrange decrease is also more difficult to control due to the sensitivity to the location of the diffuser 34 relative to the focal point and the interaction of the focused beam with the diffuser features. Finally, placing the diffuser 34 at a focus has the disadvantages of producing very large speckles (requiring large and fast diffuser motion in order for the speckles to not be visible, and potentially resulting in poor uniformity) and introducing the possibility of physical damage to the diffuser material.

Other possible diffuser locations are within or after the fly's eye integrator 40. In order to prevent edge roll-off in the illumination, the diffuser 34 placed within the fly's eye integrator 40 should be positioned immediately behind the first lenslet array 42a. Space constraints could make this difficult to achieve, and would necessarily introduce some edge roll-off. The diffuser 34 located after the fly's eye integrator 40 should be placed as closely as possible to the liquid-crystal spatial light modulator 52. This can be very difficult with reflective modulators because the diffuser 34 should not be placed in the imaging path. Hence, space and image quality constraints make this a less desirable location with reflective spatial light modulators. Another disadvantage of putting the diffuser 34 near the spatial light modulator 52 is that the benefit of the fly's eye integrator 40 for overlapping the contributions from the diffuser 34 is negated.

In summary, according to the present invention the diffuser is located between the light source 20 and the spatial light modulator 52, and the preferred location for the diffuser 34 is in the collimated beam 32 between the beam expansion optics 24 and the fly's eye integrator 40. This appears to give the optimum combination of control over lagrange, illumination uniformity, and speckle reduction. Also, because the beam-shaping optics 38 image the lenslets of the first lenslet array 42a onto the liquid-crystal spatial light modulator 52, the diffuser 34 located just before the first lenslet array 42a would be approximately conjugate to the liquid-crystal spatial light modulator 52. Conjugate means that the diffuser is imaged onto the spatial light modulator by the intervening optics. Modeling suggests this can be an optimum location for speckle reduction.

Figure 2:
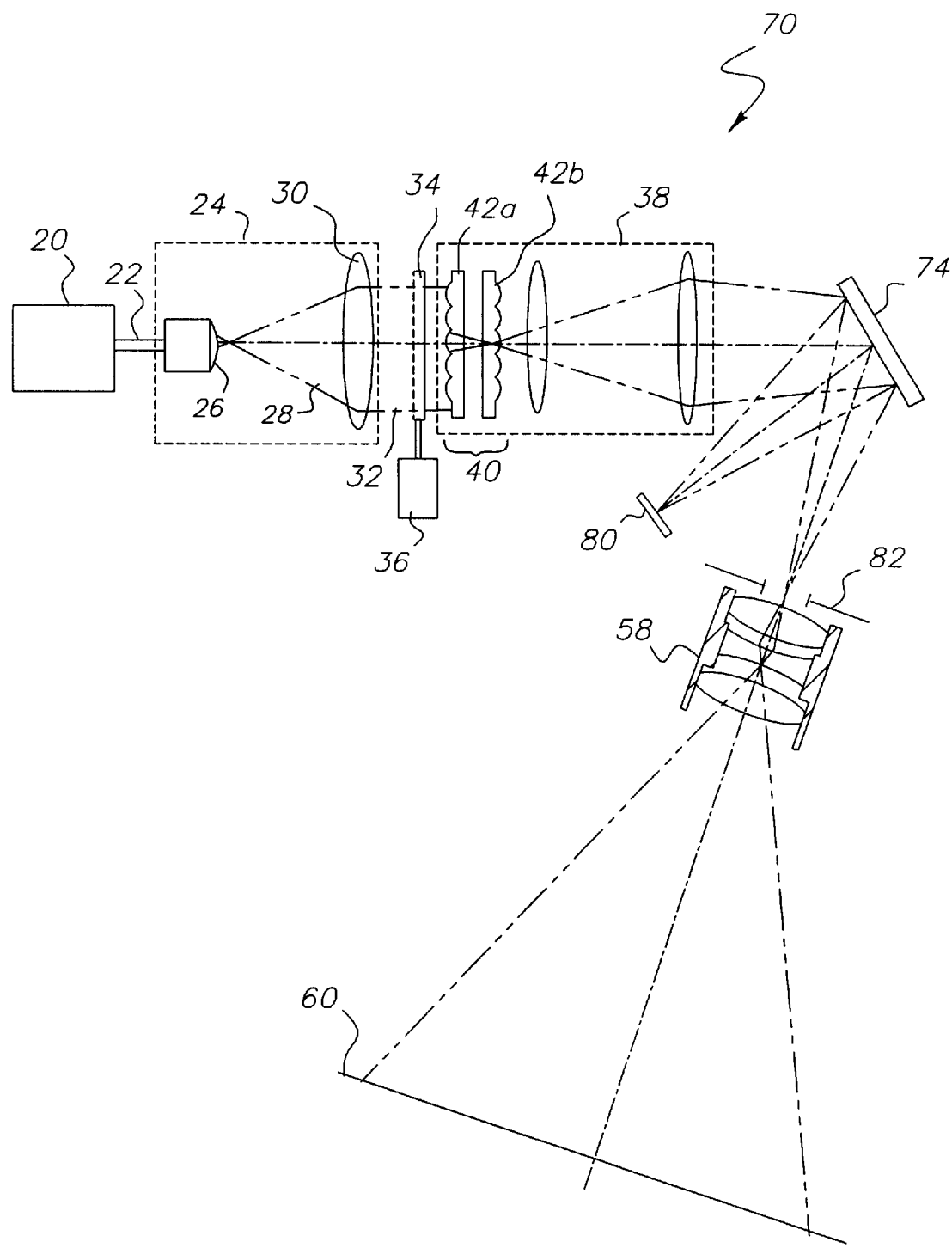
FIG. 2 is a cross-sectional view of the laser display system according to the present invention using a micromirror-array light valve.

FIG. 2 shows a cross-section of a laser projection display 70 using a micromirror array 74, such as the DLP chip available from Texas Instruments. Unlike systems using a liquid-crystal spatial light modulator, which rely on controlled polarization effects to modulate the light, the micromirror array 74 utilizes angular control of the beamlets of light on a pixel-by-pixel basis. This system is substantially the same as the system shown in FIG. 1, except the illumination converges to an aperture 82 beyond the micromirror light valve 74. Individual pixels are formed by micromirrors that either direct light through the aperture of the projection lens 58, or toward a stop 80 (i.e. a Schlieren optical system). Pixel brightness is controlled by selecting the proportion of time within a frame that light is directed through the lens aperture 82.

The maximum diffusion angle of diffuser 34 is selected to allow negligible light to pass through the projection lens aperture 82 when a mirror is switched into the off state. In practice, this is a diffusion angle (in light valve space) that is much less than 2 times the mirror tilt angle (e.g. about 20°). For example, consider the previously described system wherein the laser beam 32 was diffused to provide a ~0.6 mm lagrange; in this case the standard DLP chip has a 0.7" diagonal dimension. If the lagrange is held constant, then the resulting collection is approximately f/7.5 or an about 4.0° half angle. This system speed is much slower than that used for DLP systems (about f/3.5), and thus would allow for the design of a simplified projection lens. The reduced speed could also result in higher contrast modulation than the prior art systems.

Figure 3:
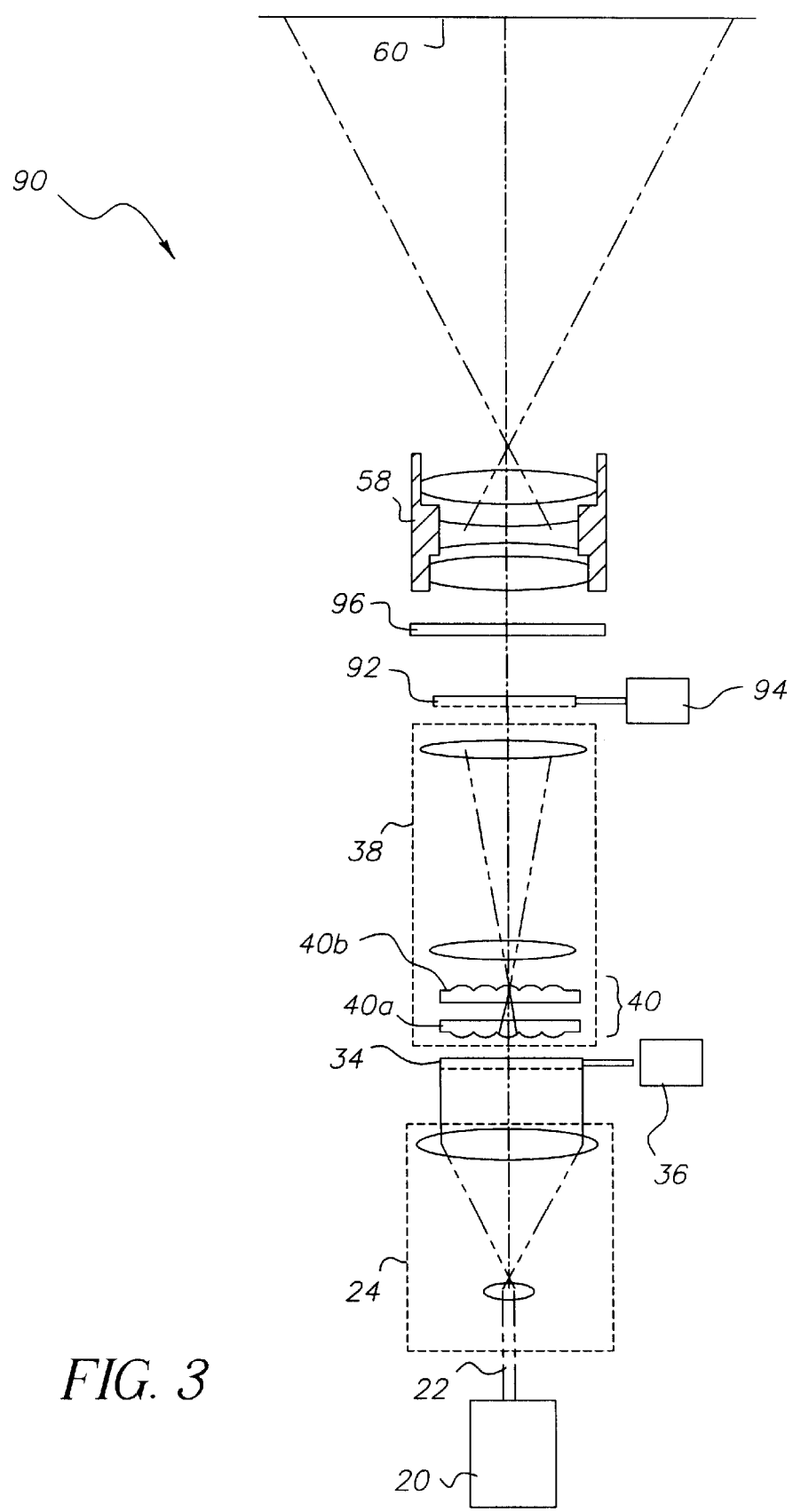
FIG. 3 is a cross-sectional view of an alternative embodiment of a laser display system according to the present invention, incorporating multiple diffusers.

Multiple diffusers can also be used to magnify the despeckling effect or to decouple despeckling from the reduction of brightness in the laser beam. FIG. 3 shows a laser projection display 90 in which multiple diffusers 34, 92 are incorporated. At least one of the diffusers is moved by motion imparting means 36, 94. It is preferred that the first diffuser 34 move in order to remove coarse intensity variations as would arise from the diffusion from the illumination of the light modulator 96. The two motion imparting means (36 and 94) can be combined into one mechanism, which imparts motion to both diffusers.

Figure 4:
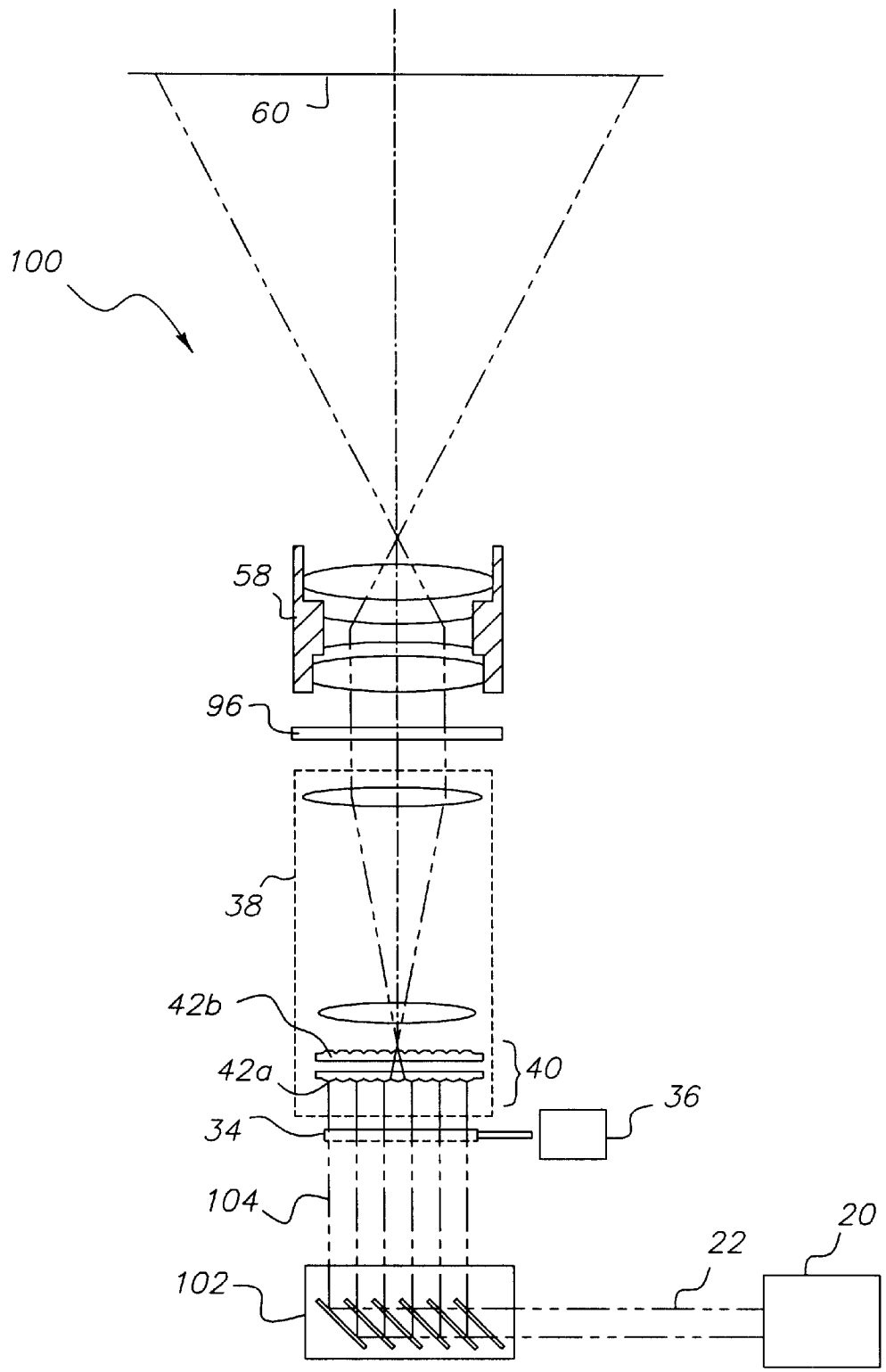
FIG. 4 is a cross-sectional view of an alternative embodiment of the laser display system according to the present invention, incorporating multiple delays on the order of the coherence length.

FIG. 4 shows a laser projection display 100, in which optical path delay differences are incorporated to reduce temporal coherence of the laser beam. An array 102 of partially reflecting mirrors imposes optical path length differences between adjacent beams 104 that are on the order of the coherence length of the laser or larger. There are N beams produced by the array of partially reflecting mirrors 102 (i.e. N mirrors). The array of partially reflecting mirrors function as the beam expander in this embodiment. The fly's eye array 40 is designed to have M lenslets illuminated by each beam in order to provide uniform illumination at the light valve, thus there are a total of at least M×N lenslets in each array. The effect at the screen 60 is that each of the N laser beams will produce their own fine speckle pattern dictated by the diffuser, the M fly's eye lenslet pairs used by a given beam, and the screen. The N speckle patterns will add incoherently to produce an overall averaging even without the motion of the diffuser. The diffuser can be moved to wash out each speckle pattern for a more complete removal of the speckle from the scene.

The invention has been described with respect to a two-dimensional (area) spatial light modulator, such as a liquid-crystal panel or a micromirror array. However, the invention can also be applied to projection systems based on linear spatial light modulators, such as the grating light valve (GLV) from Silicon Light Machines or a conformal grating device as described in U.S. patent application Ser. No. 09/491,354, filed Jan. 26, 2000 by Kowarz, which is incorporated herein by reference.

Figure 5:
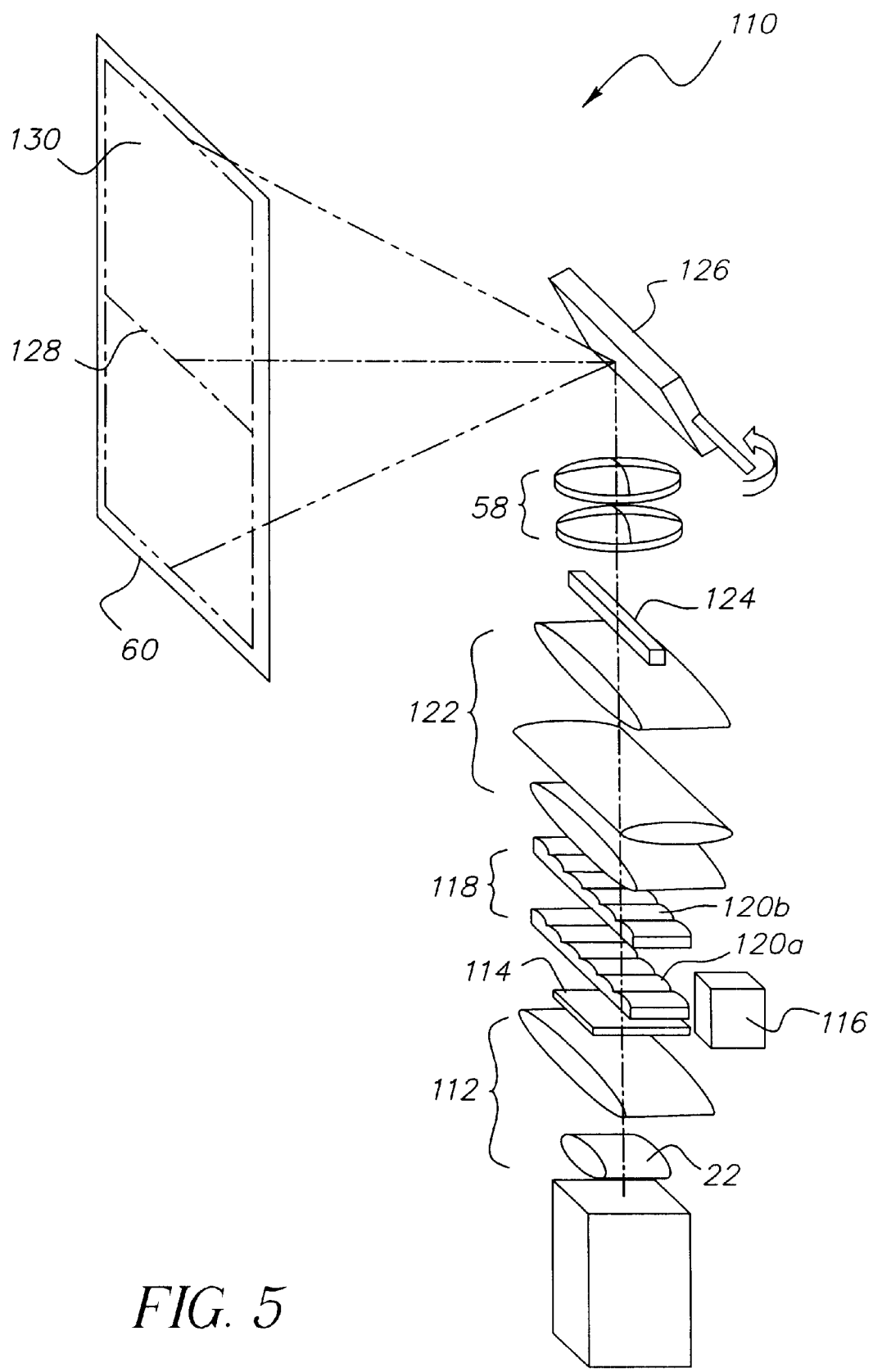
FIG. 5 is a perspective view of the invention applied to a linear light valve system.

FIG. 5 shows a laser projection display 110 that uses a linear spatial light modulator 124 to encode image data. A one-dimensional diffuser 114 that only diffuses light along the length of the light valve array (x direction in the Fig.) is used. Motion of the diffuser in the direction parallel to the diffusion (i.e. x direction) is imparted by motion imparting means 116. A two-dimensional motion can be used as long as a component of the motion is in the x direction. The one-dimensional diffuser 114 produces just enough diffusion in order to efficiently illuminate the light valve and not enough to introduce flair light at the image. An example would be one of the diffractive line generators available from MEMS Optical.

An anamorphic beam expander 112 expands the laser beam 22 in the direction of the linear light valve (x-direction). The anamorphic beam expander can be, for example, an afocal pair of cylinder lenses as is well-known to one skilled in the art of optical design. A one-dimensional fly's eye integrator 118 includes a first and second cylindrical lenslet array 120a, 120b, in which the lenslets have power only in the lenslet array direction (also the light valve array direction, x-direction). The anamorphic beam coupling optics 122 generates a uniform illumination matched in width to the length of the linear light modulator 124, and the appropriate illumination in the narrow direction (cross-array or y-direction) of the light valve. In the embodiment wherein the light valve is a grating light valve, the anamorphic beam coupling optics produces a focus at the light valve in the narrow direction (y-direction).

The linear light valve generates a single line 128 of the image. A scanner such as a galvanometer mirror 126, a spinning polygon, or a rotating prism sweeps the image lines across the screen to form a two-dimensional image 130.

Figure 6:
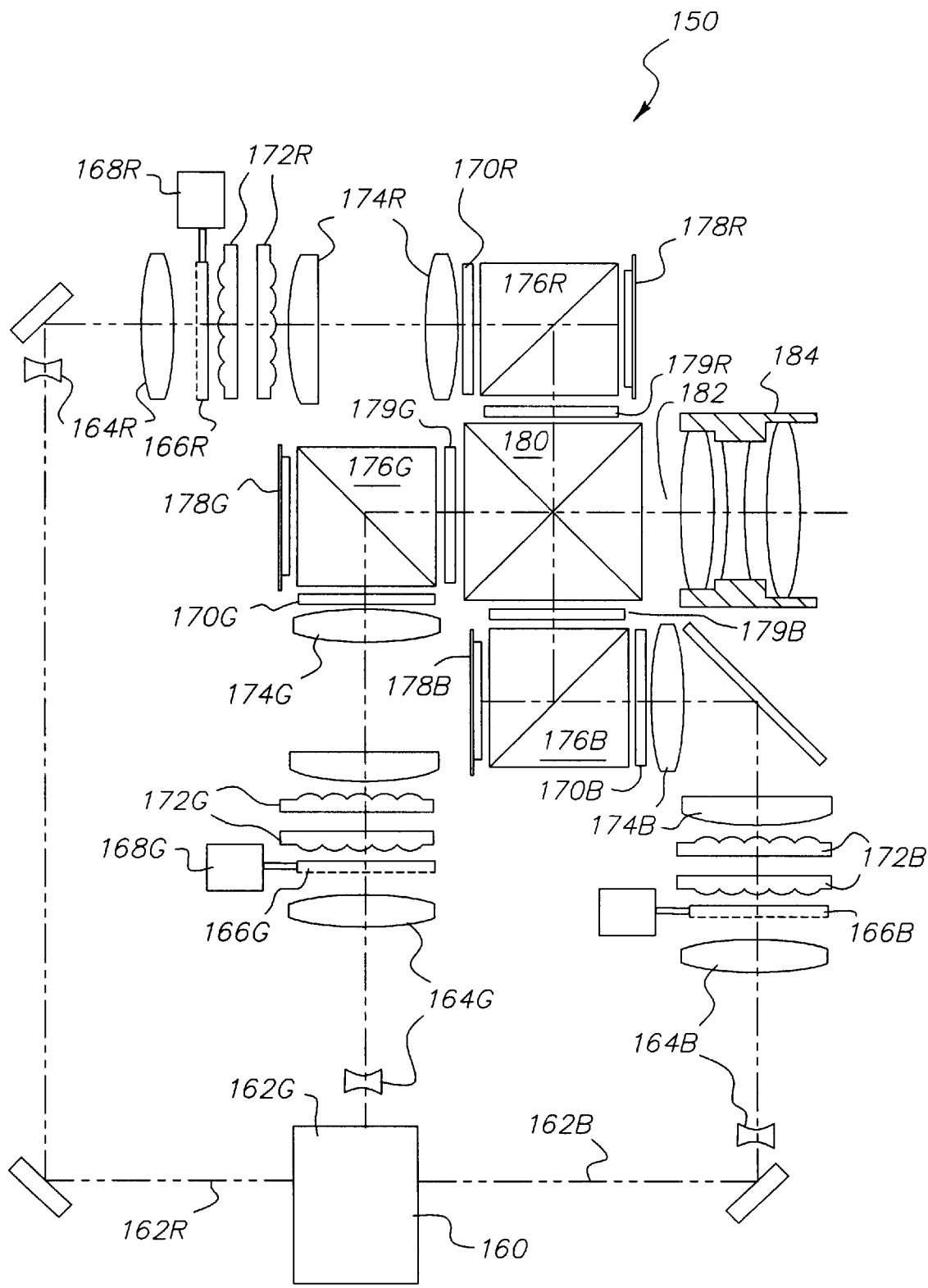
FIG. 6 is a cross-sectional view of a full-color laser display system using liquid-crystal light valves.

For simplicity, the invention has been demonstrated with a single laser beam and single spatial light modulator. FIG. 6 shows a full-color laser projection display 150 employing the inventive concepts. In the preferred embodiment, an RGB laser 160 includes a single laser oscillator pumping an optical parametric oscillator with further nonlinear optical elements (not shown) to simultaneously generate red, green, and blue laser beams 162R, 162G, 162B respectively. Alternatively, the RGB laser source 160 can include separate lasers or arrays of lasers, each laser or separate array producing red, green, or blue light. As with the prior systems, projection display 150 of FIG. 6 includes beam expansion optics (164 R,G,B), one or more moving diffusers (166 R,G,B) driven by motion imparting means (168 R,G, B), optional pre-polarizers (170 R,G,B), fly's eye integrators (172 R,G,B), coupling optics (174 R,G,B), polarizing beam splitters (176 R,G,B), spatial light modulators (178 R,G,B), and polarization analyzers (179 R,G,B). The figure shows only the case of the preferred embodiment used with liquid-crystal light valves. The same concepts can be applied with the alternative embodiments and with other light valves as described above.

The red, green and blue components of the projected image are combined as shown in FIG. 6 to form a multi-color beam 182, for example with an X-prism 180 and sent through projection optics 184. Alternatively, the red, green and blue components can be combined using plate dichroic mirrors or a Philips prism configuration as is known in the art. Alternatively the color components can be combined into a white light beam prior to passing through a single set of beam expansion optics, diffuser, and beam coupling optics. In this embodiment, the illuminating light would be split into three colors just before the light valves and recombined just after the light valves.

According to a color-sequential embodiment of the invention, a single white light beam passing through a single set of beam expansion optics, diffuser, and beam coupling optics. A red, green, blue filter wheel is placed in the white light beam to sequentially illuminate a single light valve with red, green, and blue light to produce a color sequential image. Alternatively, the laser can sequentially emit red, green, and blue light, and the filter wheel is not be required.

The invention has been described in detail with particular reference to certain preferred embodiments thereof, but it will be understood that variations and modifications can be effected within the spirit and scope of the invention.

Parts List 10 laser display system
20 laser
22 laser beam
24 beam expansion optics
26 diverging lens
28 diverging beam
30 collimating lens
32 collimated beam
34 diffuser
36 motion imparting means
38 beam-shaping optics
40 fly's eye integrator
42a first lenslet array
42b second lenslet array
44 condenser lens
46 field lens
48 pre-polarizer
50 polarizing beam splitter
52 liquid-crystal spatial light modulator
54 analyzer
56 modulated light beam
58 projection lens
60 screen
70 laser projection display
74 micromirror array
80 stop
82 aperture
90 laser projection display
92 secondary diffuser
94 secondary motion imparting means
96 spatial light modulator
100 laser projection display
102 array of partially reflecting mirrors
104 array of beams
110 laser projection display
112 anamorphic beam expansion optics
114 one-dimensional diffuser
116 one-dimensional motion imparting means
118 one-dimensional fly's eye integrator
120a first cylindrical lenslet array
120b second cylindrical lenslet array
122 anamorphic beam coupling optics
124 linear spatial light modulator
126 scanner
128 image line
130 area image
150 full-color laser projection display
160 RGB laser
162R red laser beam
162G green laser beam
162B blue laser beam
164R red beam expansion optics
164G green beam expansion optics
164B blue beam expansion optics
166R red channel diffuser
166G green channel diffuser
166B blue channel diffuser
168R red channel motion imparting means
168G green channel motion imparting means
168B blue channel motion imparting means
170R red channel pre-polarizer
170G green channel pre-polarizer
170B blue channel pre-polarizer
172R red channel fly's eye integrator
172G green channel fly's eye integrator
172B blue channel fly's eye integrator
174R red channel coupling optics
174G green channel coupling optics
174B blue channel coupling optics
176R red channel polarizing beam splitter
176G green channel polarizing beam splitter
176B blue channel polarizing beam splitter
178R red channel spatial light modulator
178G green channel spatial light modulator
178B blue channel spatial light modulator
179R red channel analyzer
179G green channel analyzer
179B blue channel analyzer
180 X-prism combiner
182 multi-color beam
184 projection optics
$\theta_D$ maximum diffusion angle

What is claimed is:
1. Display apparatus, comprising:
(a) a laser light source for emitting a light beam;

(b) a beam expander for expanding the light beam;

(c) a spatial light modulator;

(d) beam shaping optics for shaping the expanded laser beam to provide uniform illumination of the spatial light modulator, the beam shaping optics including a fly's eye integrator having an array of lenslets; and (e) a moving diffuser located in the laser beam between the laser light source and the spatial light modulator.

2. The display apparatus claimed in claim 1, wherein the moving diffuser is located between the laser light source and the fly's eye integrator.

3. The display apparatus claimed in claim 2, further comprising: a second diffuser located between the fly's eye integrator and the spatial light modulator.

4. The display apparatus claimed in claim 3 wherein the second diffuser is a moving diffuser.

5. The display apparatus claimed in claim 4 wherein both the moving diffusers are moved under the influence of the same motion imparting means.

6. The display apparatus claimed in claim 1, wherein the moving diffuser includes a diffuser plate and a motor linked to the diffuser plate for providing oscillatory motion of the diffuser plate in a plane perpendicular to the laser beam.

7. The display apparatus claimed in claim 1, wherein the moving diffuser includes a diffuser plate mounted in a rotating wheel such that the diffuser rotates about an axis parallel to the laser beam.

8. The display apparatus claimed in claim 1, wherein the spatial light modulator comprises a two-dimensional array of modulator elements.

9. The display apparatus claimed in claim 8, wherein the spatial light modulator is a liquid crystal light valve.

10. The display apparatus claimed in claim 8, wherein the modulator elements are micromirrors.

11. The display apparatus claimed in claim 1, wherein the spatial light modulator comprises a one-dimensional array of modulator elements disposed in a line, and further comprising a scanner for generating a two-dimensional image.

12. The display apparatus claimed in claim 11, wherein the modulator elements are electrically-controllable diffraction gratings.

13. The display apparatus claimed in claim 1, further comprising a projection lens for producing an image on a display screen.

14. The display apparatus claimed in claim 1, wherein the laser light source is characterized by a coherence length, and wherein the beam expander comprises an array of partially reflecting mirrors to split the light beam into N beamlets, wherein adjacent beamlets propagate paths through the array of partially reflecting mirrors that differ by at least the coherence length; and wherein the beam shaping optics shapes the N beamlets to provide uniform illumination of the spatial light modulator.

15. The display apparatus claimed in claim 14, wherein the array of lenslets comprises M×N lenslets, wherein M is an integer.

16. The display apparatus claimed in claim 14, wherein the moving diffuser is located before the fly's eye integrator.

17. The display apparatus claimed in claim 15 wherein a second diffuser is located between the fly's eye integrator and the spatial light modulator.

18. The display apparatus claimed in claim 16 wherein the second diffuser is a moving diffuser.

19. The display apparatus claimed in claim 18 wherein both moving diffusers are moved under the influence of the same motion imparting means.

20. The display apparatus claimed in claim 14, wherein the moving diffuser includes a diffuser plate and a motor linked to the diffuser plate for providing oscillatory motion of the diffuser plate in a plane perpendicular to the laser beam.

21. The display apparatus in claim 14, wherein the moving diffuser includes a diffuser plate mounted in a rotating wheel such that the diffuser rotates about an axis parallel to the laser beam.

22. The display apparatus in claim 14, wherein the spatial light modulator comprises a two-dimensional array of modulator elements.

23. The display apparatus in claim 22, wherein the spatial light modulator is a liquid crystal light valve.

24. The display apparatus in claim 21, wherein the modulator elements are micromirrors.

25. The display apparatus in claim 14, wherein the spatial light modulator comprises a one-dimensional array of modulator elements disposed in a line, the display apparatus further comprising a scanner for generating a two-dimensional image.

26. The display apparatus in claim 25, wherein the modulator elements are electrically-controllable diffraction gratings.

27. The display apparatus in claim 14, further comprising a projection lens for producing an image on a display screen.

28. The display apparatus claimed in claim 1, wherein the display apparatus is a color display apparatus.

29. The display apparatus claimed in claim 28, wherein the display apparatus is a three channel color display apparatus.

30. The display apparatus claimed in claim 29, wherein the laser light source comprises a single laser oscillator and an optical parametric oscillator with nonlinear optical elements to simultaneously generate red, green and blue laser beams.

31. The display apparatus claimed in claim 29, wherein the laser light source comprises separate lasers to generate red, green and blue light beams.

32. The display apparatus claimed in claim 29, wherein the laser light source comprises a single laser for generating a white light beam that is split into three colors prior to passing through three separate light valves, and is recombined subsequent to the light valves.

33. The display apparatus claimed in claim 28, wherein the color display is a color sequential display having a white light laser and further comprising a filter wheel having red, green and blue filter sequentially produce red, green and blue colored frames.

34. The display apparatus claimed in claim 28, wherein the color display is a color sequential display having a laser that sequentially emits red, green and blue colored light.

35. The display apparatus claimed in claim 2, wherein the diffuser is located at a plane conjugate to the spatial light modulator.

* * * * *